(12) United States Patent
Hamzaoui et al.

(10) Patent No.: US 9,996,368 B2
(45) Date of Patent: Jun. 12, 2018

(54) METHOD TO ENABLE SEMI-AUTOMATIC REGENERATION OF MANUALS BY SAVING MANUAL CREATION OPERATIONS AS SCRIPTS

(75) Inventors: Karim Hamzaoui, Kanagawa (JP); Ryo Kamimura, Yokosuka (JP); Kentaro Takiguchi, Kawasaki (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2588 days.

(21) Appl. No.: 11/965,864

(22) Filed: Dec. 28, 2007

(65) Prior Publication Data
US 2009/0172533 A1 Jul. 2, 2009

(51) Int. Cl.
G06F 3/048 (2013.01)
G06F 9/44 (2018.01)

(52) U.S. Cl.
CPC .............. *G06F 9/4446* (2013.01); *G06F 8/70* (2013.01); *G06F 8/73* (2013.01)

(58) Field of Classification Search
CPC ............. G06F 8/70; G06F 8/73; G06F 9/4446
USPC ........................................................ 717/123
See application file for complete search history.

(56) References Cited

U.S. PATENT DOCUMENTS

| | | | | |
|---|---|---|---|---|
| 5,038,316 A * | 8/1991 | Hempleman et al. | ........ | 715/205 |
| 5,305,206 A * | 4/1994 | Inoue et al. | ........ | 715/222 |
| 6,237,138 B1 * | 5/2001 | Hameluck et al. | ........ | 717/128 |
| 6,389,481 B1 * | 5/2002 | Malcolm | ........ | 719/310 |
| 6,467,080 B1 * | 10/2002 | Devine et al. | ........ | 717/123 |
| 6,507,855 B1 * | 1/2003 | Stern | ........ | 715/234 |
| 7,536,684 B2 * | 5/2009 | Patrizio et al. | ........ | 717/170 |
| 7,568,184 B1 * | 7/2009 | Roth | ........ | 717/123 |
| 7,620,885 B2 * | 11/2009 | Moulckers et al. | ........ | 715/201 |
| 7,788,640 B2 * | 8/2010 | Grimaldi | ........ | 717/123 |
| 2002/0059348 A1 * | 5/2002 | Lee et al. | ........ | 707/516 |
| 2002/0188939 A1 * | 12/2002 | Hediger | ........ | G06F 9/4446 717/174 |
| 2003/0037312 A1 * | 2/2003 | Czech | ........ | 717/120 |
| 2005/0060688 A1 * | 3/2005 | Kamalakantha | ........ | G06F 8/73 717/123 |
| 2005/0144595 A1 * | 6/2005 | McLean | ........ | 717/136 |

(Continued)

FOREIGN PATENT DOCUMENTS

JP 08329271 12/1996
JP 2002132755 5/2002

(Continued)

OTHER PUBLICATIONS

Click Recorder-Automatic Help/ Manual Authoring with Screen Capture, Glue Software Corporation 2003, http://www.gluesoft.co.jp/en/ClickRec/.

*Primary Examiner* — Patrick F Riegler
(74) *Attorney, Agent, or Firm* — Griffiths & Seaton PLLC

(57) ABSTRACT

A method, system and computer program product for creating, editing, and generating operating manuals utilizing scripts. Operations performed by an author during manual creation are saved as scripts. The operations are replayed when regenerating or modifying the manual. When replaying the script of the operating manual, the script may be stopped at convenient points to add additional operations and/or modifications. These additional operations and/or modifications are also recorded as scripts to enable generation of the edited/modified manual.

16 Claims, 8 Drawing Sheets

(56) References Cited

U.S. PATENT DOCUMENTS

| | | |
|---|---|---|
| 2005/0149920 A1* | 7/2005 | Patrizi et al. ................. 717/168 |
| 2007/0136663 A1* | 6/2007 | Grigoriadis et al. ......... 715/530 |
| 2007/0214427 A1* | 9/2007 | Peck .................... G06F 9/4446 715/771 |
| 2007/0245339 A1* | 10/2007 | Bauman et al. .............. 717/174 |
| 2009/0037801 A1* | 2/2009 | Ye et al. ....................... 715/202 |

FOREIGN PATENT DOCUMENTS

| | | |
|---|---|---|
| JP | 2002297793 | 10/2002 |
| JP | 2004030689 | 1/2004 |
| JP | 2006227730 | 8/2006 |

* cited by examiner

METHOD TO ENABLE SEMI-AUTOMATIC REGENERATION OF MANUALS BY SAVING MANUAL CREATION OPERATIONS AS SCRIPTS

BACKGROUND

1. Technical Field

The present invention generally relates to computer-based operations and in particular to a method for the generating manuals within a computer system.

2. Description of the Related Art

Operating manuals are commonly provided with various components and devices (e.g., computer systems, electronic devices, construction equipment, medical devices, software applications, et al.) to enable users to quickly access information about operating the component. These manuals are generated at the time of creating the component or device to which the manual refers, and the process for generating the manuals is time intensive. Currently, systems for creating these operating manuals primarily emphasize creating the manual, with little emphasis placed on enabling future modification of the manual. Thus, when an existing operating manual requires modification, the existing manual is appended to or a new manual has to be created entirely from scratch.

If an operating manual for a device requires image alterations, operating system modifications, and/or language translations, the manual is recreated from scratch in a time intensive process. For example, if there was a change in screen layout of a computer software manual the screen images in the manual would have to be reinserted and the manual recreated. Also if any images are added to the manual, each alteration would require reinserting the screen images and adjusting previous images and the accompanying text. Thereby, adding or modifying images in the operating manuals becomes tedious and time consuming. With time sensitive projects, recreating the manual from scratch may cause major project delays.

Also, when a manual is required in multiple different languages (e.g., for components/devices shared and/or utilized by people in a plurality of different language speaking countries) the operating manual has to be translated into the various languages. Frequently, manuals ranging from a few pages to thousands of pages require total recreation due to the vast difference in the transcript of languages. Use of human transcribers is typically required, particularly in light of the inclusion of visual images or pictures within the manual, with embedded text and characters that cannot be translated via computerize translation.

SUMMARY OF ILLUSTRATIVE EMBODIMENTS

Disclosed are a method, system and computer program product for creating, editing, and generating operating manuals utilizing scripts. Operations performed by an author during manual creation are saved as scripts. The operations are replayed when regenerating or modifying the manual. When replaying the script of the operating manual, the script may be stopped at convenient points to add additional operations and/or modifications. These additional operations and/or modifications are also recorded as scripts to enable generation of the edited/modified manual.

The above as well as additional features of the present invention will become apparent in the following detailed written description.

BRIEF DESCRIPTION OF THE DRAWINGS

The invention itself will best be understood by reference to the following detailed description of an illustrative embodiment when read in conjunction with the accompanying drawings, wherein.

DETAILED DESCRIPTION OF ILLUSTRATIVE EMBODIMENTS

Figure 1:
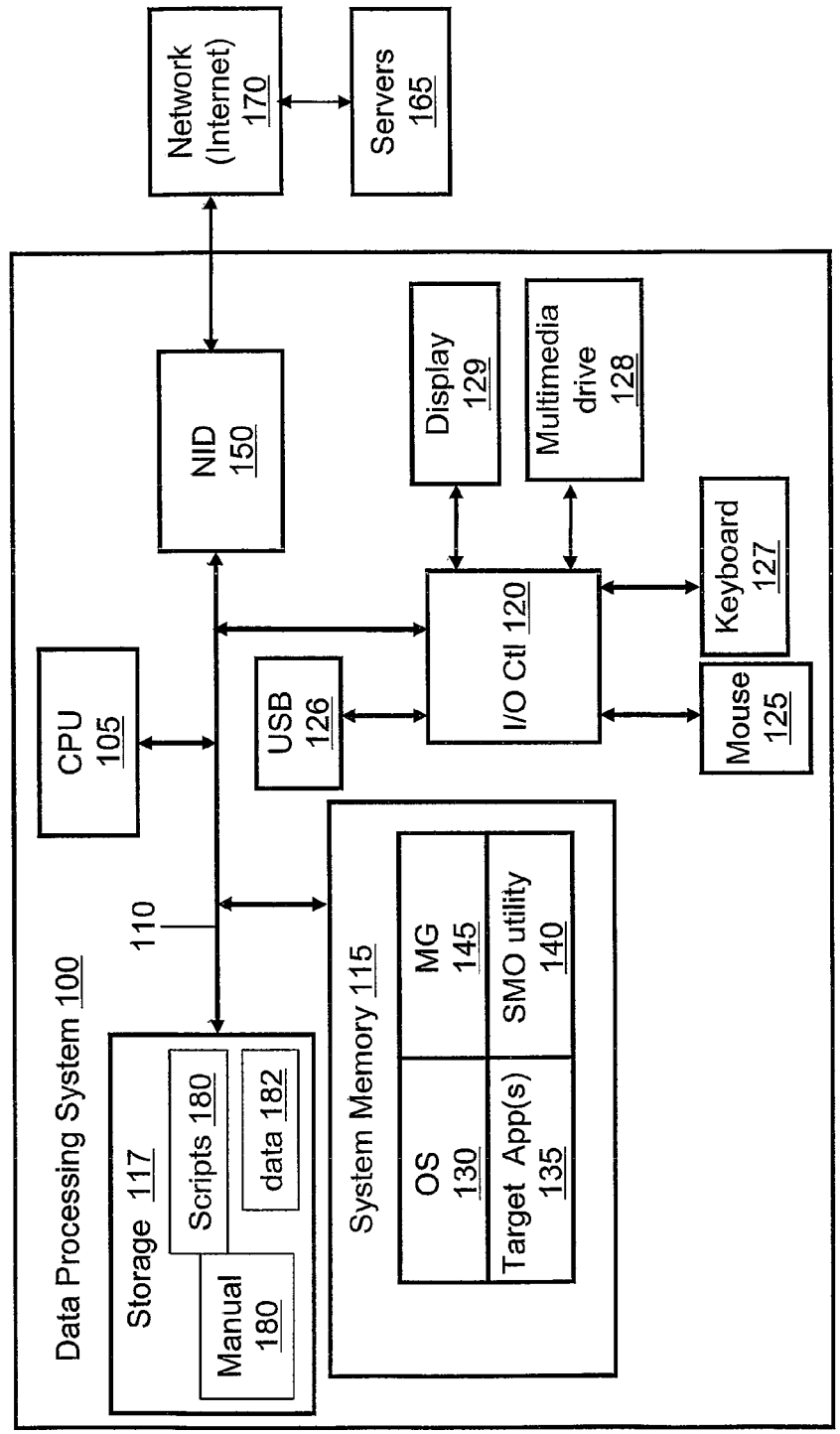
FIG. 1 is a diagram of an example data processing system with functional components that enable manual creation, editing and regeneration via scripts, according to one embodiment of the invention.

The illustrative embodiments provide a method, system and computer program product for creating, editing, and generating operating manuals utilizing scripts. Operations performed by an author during manual creation are saved as scripts. The operations are replayed when regenerating or modifying the manual. When replaying the script of the operating manual, the script may be stopped at convenient points to add additional operations and/or modifications. These additional operations and/or modifications are also recorded as scripts to enable generation of the edited/modified manual.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g, 1xx for FIG. 1 and 2xx for FIG. 2). The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized. Specifically, as utilized herein, the term script refers to source code (also referred to as code) written in a readable (human-readable) programming language. Script properties may include, but are not limited to: text, size (of text, illustrations, charts, tables, and graphs), location specifications, and control identifications (IDs) which are utilized to describe names (or titles) that identify functions of a graphical user interface (GUI).

With reference now to the figures, FIG. 1 depicts a block diagram representation of a data processing system (and connected network). DPS 100 comprises at least one processor or central processing unit (CPU) 105 connected to system memory 115 via system interconnect/bus 110. Also connected to system bus 110 is I/O controller 120, which provides connectivity and control for input devices, of which pointing device (or mouse) 125 and keyboard 127 are illustrated, and output devices, of which display 129 is illustrated. Additionally, a multimedia drive 128 (e.g., CD-RW or DVD drive) and USB (universal serial bus) port 126 are illustrated, coupled to I/O controller. Multimedia drive 128 and USB port 126 may operate as both input and output (storage) mechanisms. DPS 100 also comprises storage 117, within which data/instructions/code may be stored and where manual 180 and associated scripts 181 and manual data 182 may be stored. DPS 100 is also illustrated with a network interface device (NID) 160, with which DPS 100 connects to one or more servers 165 via an access network, such as the Internet 170.

Notably, in addition to the above described hardware components of DPS 100, various features of the invention are completed via software (or firmware) code or logic stored within system memory 115 or other storage (e.g., storage 117) and executed by CPU 105. Thus, illustrated within system memory 115 are a number of software/firmware components, including operating system (OS) 130 (e.g., Microsoft Windows®, a trademark of Microsoft Corp, GNU®/Linux®, registered trademarks of the Free Software Foundation and Linus Torvalds, or AIX®, a registered trademark of IBM), target application(s) 135, manual generating software 145, and semi-automatic manual operations (SMO) utility 140. In actual implementation, manual generating software 145 and SMO utility 140 may be combined as a single application collectively providing the various functions of each individual software component when the corresponding code is executed by CPU 105. For simplicity, SMO utility 140 is illustrated and described as a stand alone or separate software/firmware component, which provides specific functions, as described below.

CPU 105 executes SMO utility 140, manual generating software 145, as well as OS 130, which supports the user interface features of SMO utility 140. In the illustrative embodiment, SMO utility 140 provides several graphical user interfaces (GUI) to enable user interaction with, or manipulation of, the functional features of the utility (140). Among the software code/instructions provided by SMO utility 140, and which are specific to the invention, are: (a) code for creating manuals utilizing scripts; (b) code for editing manuals; and (c) code for regenerating manuals. For simplicity of the description, the collective body of code that enables these various features is referred to herein as SMO utility 140.

According to the illustrative embodiment, when CPU 105 executes SMO utility 140, DPS 100 initiates a series of functional processes that enable the above functional features as well as additional features/functionality, which are described below within the description of FIGS. 2-8.

Those of ordinary skill in the art will appreciate that the hardware and basic configuration depicted in FIG. 1 may vary. For example, other devices/components may be used in addition to or in place of the hardware depicted. The depicted example is not meant to imply architectural limitations with respect to the present invention. The data processing system depicted in FIG. 1 may be, for example, an IBM eServer pSeries system, a product of International Business Machines Corporation in Armonk, N.Y., running the Advanced Interactive Executive (AIX) operating system or LINUX operating system.

The script (pseudo-code) generated by SMO utility 140 is recorded during creation of the manual. An example script generated by SMO utility during manual creation is now provided:

```
startApp("setup.exe");
// Window: IBM DB2 Setup Launch Pad
graphicwin( ).click( );
dB2UDBEnterpriseServerEditonr( ).click;
nextbutton( ).click;
// Window: DB2 Setup Wizard
nextNbutton( ).click;
agreeAradioButton( ).click( );
nextNbutton2( ).click( );
datawarehouseDcheckBox( ).click( );
satellitemanagementfunctionSch( ).click( );
nextNbutton( ).click( );
// Window: Warning
okbutton( ).click( );
// Window: DB2 Setup Wizard
nextNbutton( ).click( );
comboBoxcomboBox( ).click(ARROW);
comboBoxcomboBox( ).click(atText("C:/"));
changeCbutton( ).click( );
comboBoxcomboBox2( ).click(ARROW);
comboBoxcomboBox2( ).click( );
okbutton2( ).click( );
nextNbutton( ).click( );
richEdittext( ).click;
dB2SetupWizardBD2EnterpriseSer( ).inputChars( "password" );
richEdittext2( ).click( );
dB2SetupWizardBD2EnterpriseSer( ).inputChars( "password" );
nextNbutton( ).click( );
nextNbutton( ).click( );
// Window; Warning
Okbutton ( ).click( );
*snip*
endbutton( ).click( );
```

The above example script contains controls such as nextNbutton, and each control has properties wherein the properties comprise .class, .classIndex, and .text. In the illustrative embodiment, the properties of the nextNbutton include the values of "button" for .class, "3" for .classIndex, and "Next(N)>" for .text. When rerunning the script, recorded control properties and those displayed on the screen are compared in order to identify target controls to be operated.

In one embodiment, SMO utility 140 is executed to generate the script during the creation of an English language manual. As will be described in detail below with reference to FIG. 5, when utilizing the script (generated by SMO utility 140) to create a Japanese version of the manual, the nextNbutton control has a unique ".text" property. The value of "Next(N)>" for ".text" is written in Japanese. However, a combination of other properties such as ".class" and ".classIndex" are sufficient to form a unique identification of each control displayed, even when the text is of a different language.

Figure 2:
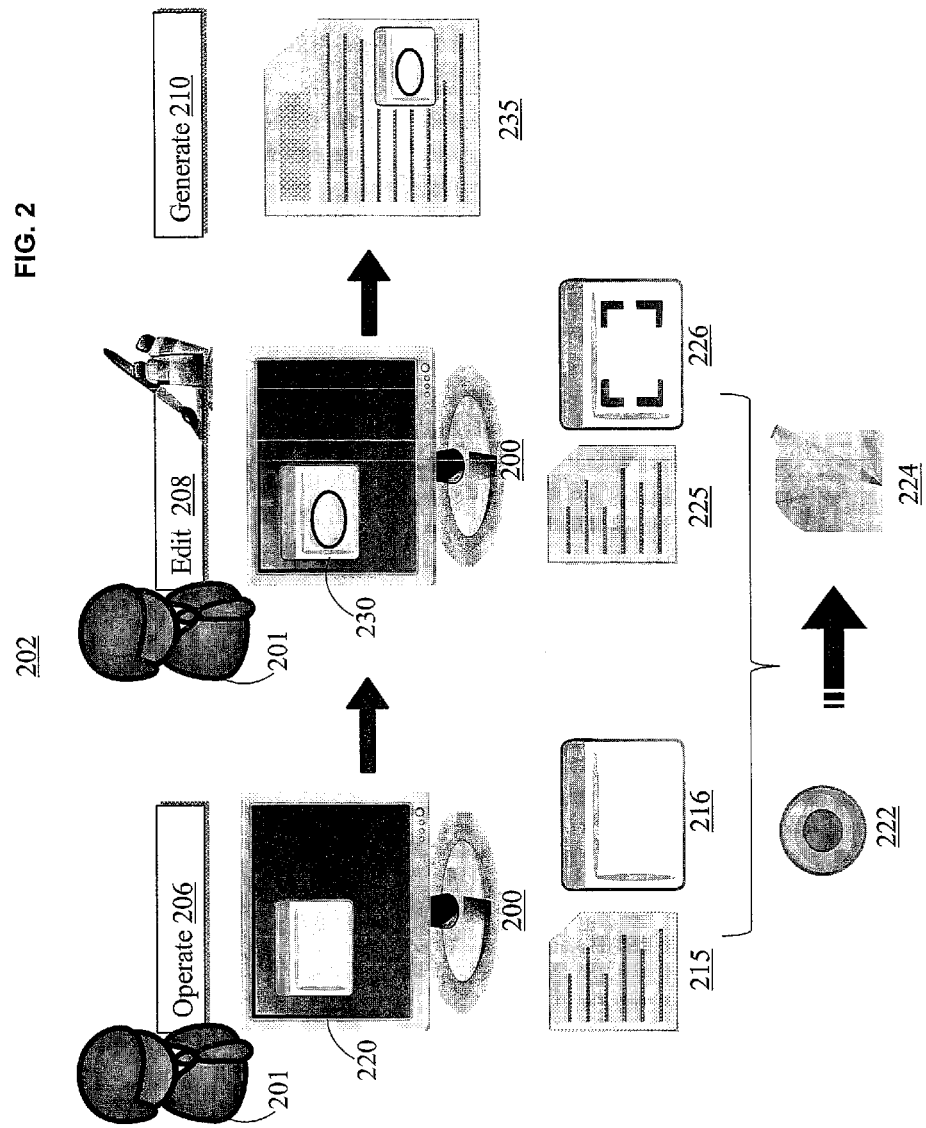
FIG. 2 illustrates the operate, edit, and generate operations by which a manual is created, in accordance with one embodiment of the invention.

With reference now to FIG. 2, which illustrates a sequence flow diagram within which operate, edit, and generate operations are performed during manual creation. Sequence flow diagram 202 provides three stages of operations, namely operate operation 206, edit operation 208, and generate operation 210. Illustrated within sequence flow diagram 202 are manual author 201, who interacts with target application on DPS 200 to generated manual 235. As provided within the display of DPS 200, target application provides a screen image (or graphic) 220, which may be modified to generate edited/modified screen image 230 during the manual generation and editing processes. The modified screen image is ultimately utilized within the generated manual 235. Sequence flow diagram 202 also illustrates record function (or button) 222, which is a functional component of SMO utility 140 that is visible to manual author 201 on the display screen.

During the manual generation process, manual author 201 interacts with target application and extracts a copy of screen image 220 and text (not shown on screen) from the target application. The extraction process results in generation of extracted text 215 and extracted screen image 216 (which is screen image 220 extracted by manual author 201). Manual author 201 then edits the extracted text 215 and extracted screen image 216 during the edit operation 208 (on DPS 200) to create edited text 225 and edited/modified screen image 226 (which corresponds to edited screen image 230).

While the extraction and editing operations are being performed by manual author 201, SMO utility 140 triggers the record function 222 to generate a corresponding script 224 of the processes implemented by the manual author to create the edited text 225 and edited screen image 226. Record function 222 thus produces manual script 224, which is saved within storage 117.

In one embodiment, record function 222 first generates manual script 224 for text 215 and screen image 216, and then records the sequence of operations that occur to modify either text 215 or screen image 216, on each screen transition. Record 222 specifically records all script properties supplied during manual creation (i.e. control identifications, coordinates, text/image dimensions) to form script 224.

When the generate operation 210 is implemented, the manual generation software generates the manual 235 using a combination of the originally captured text and screen images (extracted text 215 and extracted screen image(s) 216) along with the sequence of operations to produce the edited/modified versions (edited text 225 and edited screen image 226) within the layout of the manual 235. Generated manual 235 is produced by positioning edited text 225 and edited screen image 226 together (into a pattern) to form generated manual 235.

Figure 3:
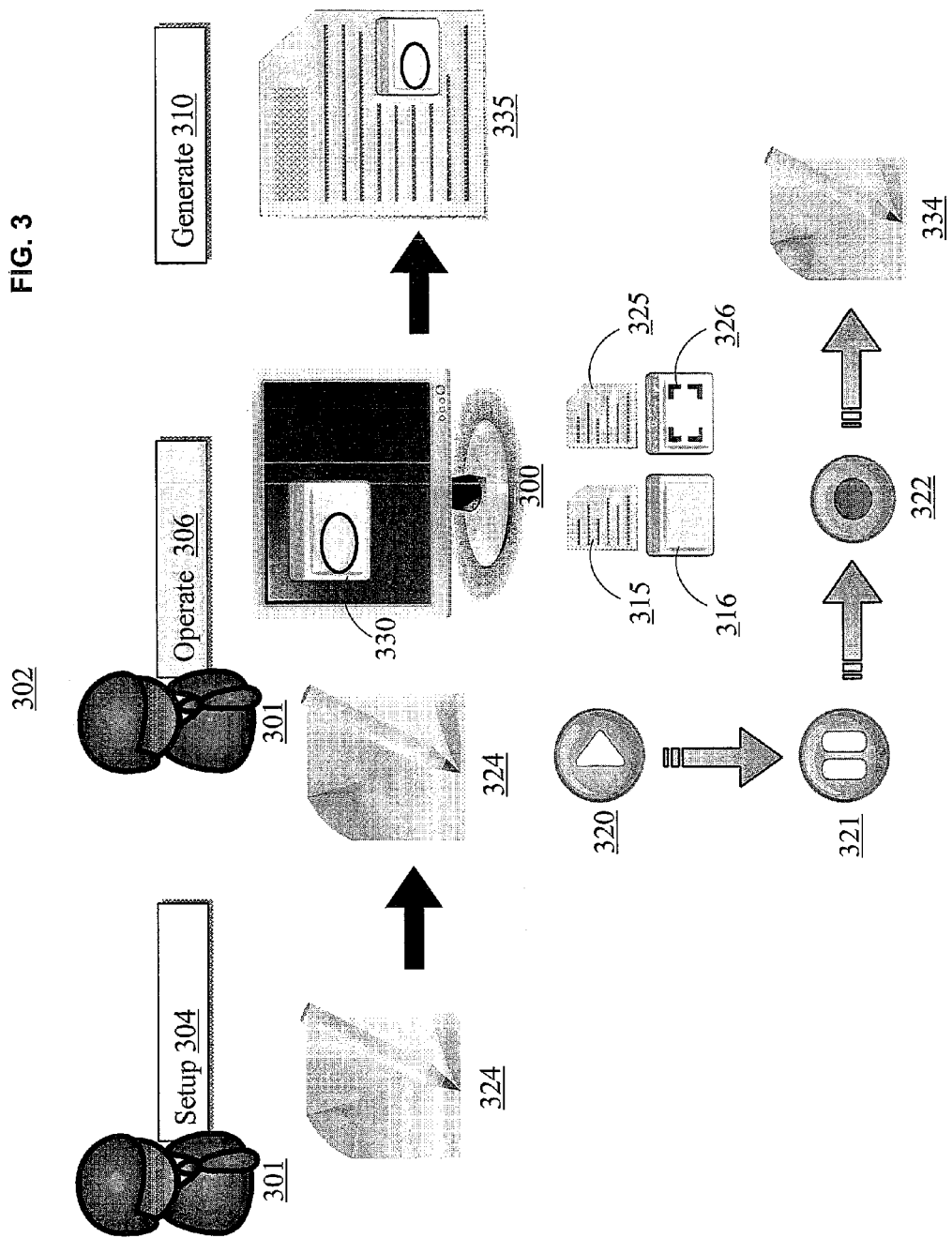
FIG. 3 is a diagram illustrating the regeneration and modification operations utilized in manual editing, according to one embodiment of the invention.

FIG. 3 illustrates a second sequence flow diagram 302 in various operations are provided to enable manual generation and/or regeneration from a script, according to one embodiment. Specifically, sequence flow diagram 302 illustrates setup operation 304, operate operation 306, and generate operation 310 during which manual author 301 retrieves a script 324 and runs (plays) the script using SMO utility 140 to generate or re-generate a manual 335. Thus, as shown, during setup operation 304, manual author retrieves script 324 from script storage location (e.g., storage 117) and passes the retrieved script 324 to executing SMO utility 140 (or manual generation software, whose functionality is assumed to be incorporated into SMO utility 140 for simplicity in describing the various operations). SMO utility executes on DPS 300, and provides a set of functional components (e.g., GUIs, buttons, other visual/operational affordances, etc.), with which manual author 301 interacts during operate operations 306. Of the various functions supported by SMO utility, three are illustrated and provide the following functionality. Play function 320 initiates the playing of script 324, pause 321 halts the playing of script 324, and record function 322 updates or stores the modifications/edits performed on script 324 to produce edited script 334.

During operate operations 306, manual author 301 plays the script 324 by activating play function 320 of SMO utility 140 on DPS 300. As shown by sequence flow diagram 302, original text 315 and original screen image 316 are provided during the initial play of the script. When the script has been previously edited, the editing operations recorded within the script implement a modification of the original content (315, 316) to generate edited text 325, and edited screen image 326.

In one embodiment, edited text 325 and edited screen image 326 are generated during operate operations 306. In this embodiment, manual author 301 interrupts play of the script 324 by activating pause function 321. Activating pause function 321 enables manual author 301 to modify the script at specific location(s) within the script by adding new operations or by editing the current content. In a related embodiment, additional operating functions, such as rewind and fast forward are also provided to enable selection of specific locations at which the manual author 301 may modify the existing script. With the script paused, manual author 301 may then add new operation(s) and/or edit the original content. Editing of the original content is completed via a process similar to that illustrated in FIG. 2 and described above.

Once the editing or addition of new operations are completed, manual author 301 selects record function 322, which updates and saves (in storage) the edited/updated version of the script, edited script 334. Edited script 334 thus includes additional operations, commands, and edits recorded from manual author 301. With the edited script 334, the generate operation 310, automatically creates an updated manual 335, in which edited text 325 and edited screen image 326 are displayed (as a combination of original text 315, original screen image 316, and recorded operations and edits within edited script 334).

Figure 4:
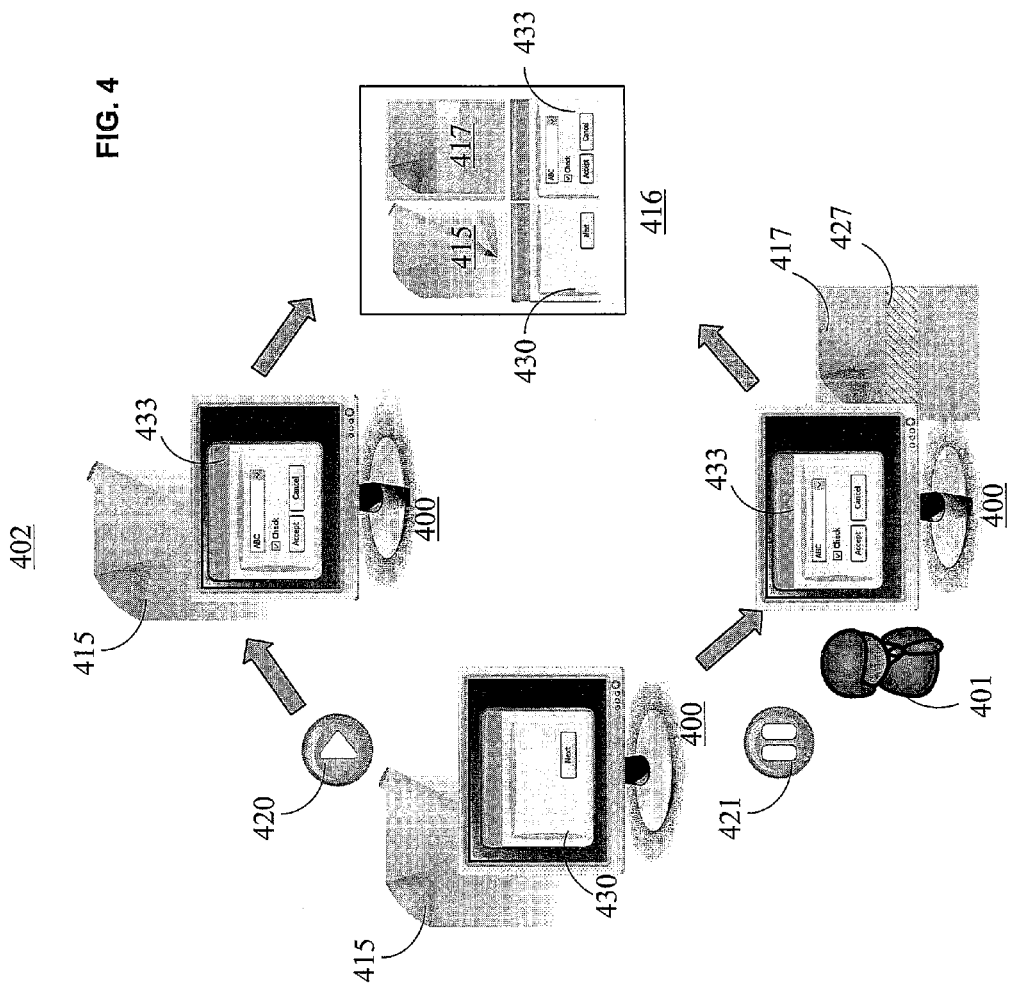
FIG. 4 is diagram illustrating regeneration of a manual following application upgrade, in accordance with one embodiment of the invention.

Sequence flow diagram 402 of FIG. 4 illustrates automatic execution of the operate operation when regenerating a manual following application upgrade. Within this automated sequence flow, decisions are based on a series of control IDs and text. The processing occurs on DPS 400 and involves SMO utility 140 implementing a series of comparisons during running of the script to identify differences in two versions of the script. The process proceeds without input from manual author 401 unless an error condition is encountered or the manual author 401 pauses (or otherwise interrupts) the process. Notably, with the illustrative embodiment, for each screen image, the rectangular position, size and other controls are recorded within the script.

SMO utility 140 activates play function 420 to initiate the processing of the script. Script provides a first GUI 433 within the manual to prompt manual author 401 to accept the execution of a process. As described above, when manual author 401 selects pause function 421, during play back of the script, manual author provides edits (on DPS 400) at a breakpoint 427 within the script 415 to generate edited script 417. While editing script 415, screen images and text are extracted from a target application and automatically modified. Modifications to screen image 430, recorded in edited script 417 may be visualized as edited (or modified) screen image 433.

SMO utility 140 compares the versions of the script for differences, and presents the differences within compare box 416. Compare box 416 displays screen image 430 and edited screen image 433. Within compare box 416, the controls added to edited screen image 433 are identified and visibly displayed. Compare box 416 illustrates that a breakpoint (e.g., pause function followed by an edit of content), such as breakpoint 427, has been made within original script 415 to generate edited script 417. Also shown within compare box is the graphical illustration of the effects of the differences in the scripts, thus original script 415 generates screen image 430, while edited script 417 generates edited screen image 433 (with "check" feature) within the manual. A difference in the resulting text may also be provided.

In one embodiment, when play 420 is executed, script properties within edited script 417 are compared to script properties of the original version of script 415. Script properties, such as control IDs, are added to script 415 to create edited script 417. If edited script 417 is not automatically generated due to additional controls or control ID changes, edited script 417 is halted, and manual author 401 is then required to continue editing manually.

Figure 5:
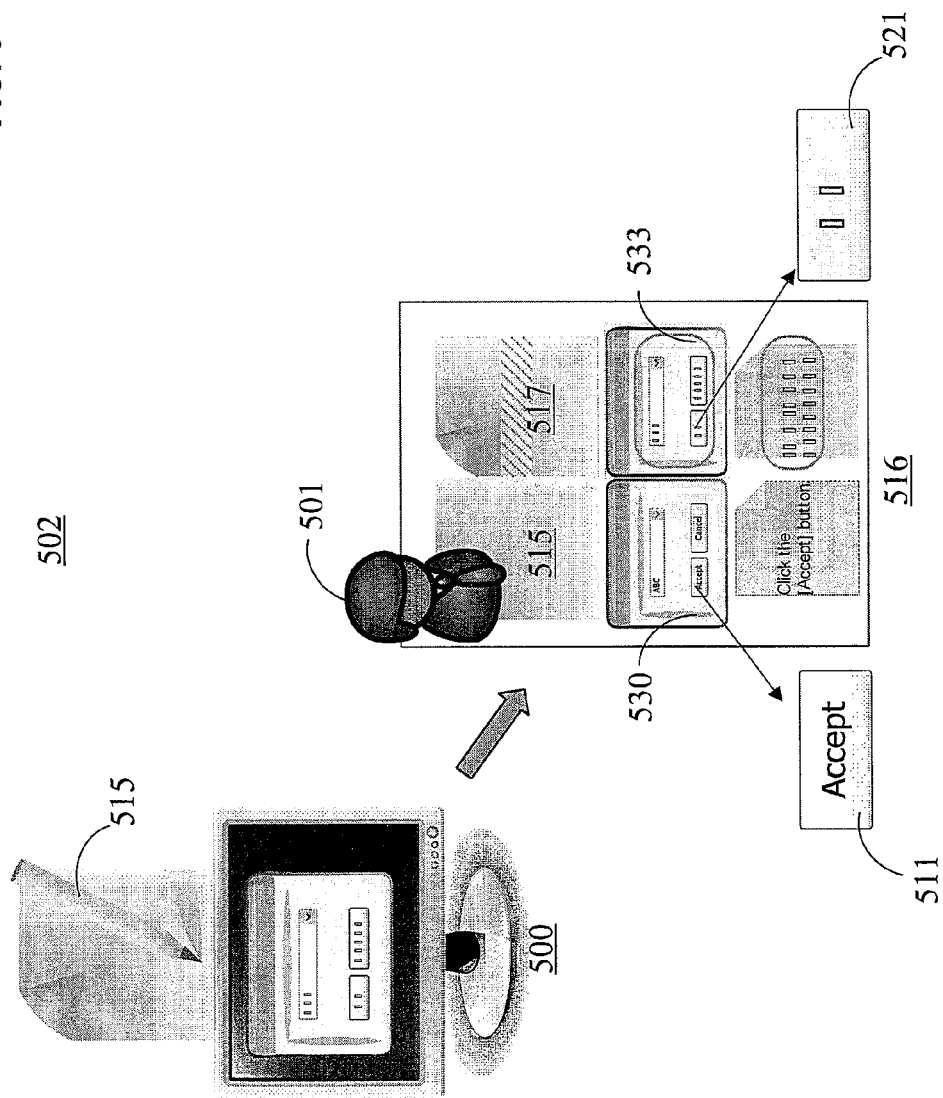
FIG. 5 is a diagram illustrating the method by which a manual is translated to a second language, according to one embodiment of the invention.

Sequence flow diagram 502 of FIG. 5 illustrates a method by which language transcription of content, including content embedded in images are efficiently completely utilizing specific functionality of SMO utility 140. Manual author 501 controls operations on DPS 500 to edit portions of content in a first language by playing the script 515 and recording operations to generate an edited script 517. The edited script 517 is then utilized to re-create the manual in a second language. Sequence flow diagram 502 illustrates the use of compare box 516 to track/monitor changes to the script and view corresponding changes to the screen image 530 and text 531.

In one embodiment, script properties are recorded during generation and regeneration of script 515 and edited script 517, respectively. In generating the script, the controls within the script is determined by the control IDS and the rectangular positions, size and other visual parameters are recorded. Subsequent modifications to the language or text within the script 515 do not change the primary structure/layout of the manual, e.g., screen image(s) 533. When the language of content within script 515 is edited, the script properties are not changed, and only the text is modified. However, the manual author 501 may also perform edits such as trimming or marking according to the recorded structure/layout parameters. Following editing operations, language A button 511 within screen image 530 is stored with the modifications/edits. In subsequent generation of the manual in the second language, the language A button 511 is replaced with language B button 521, within edited screen image 533.

Figure 6:
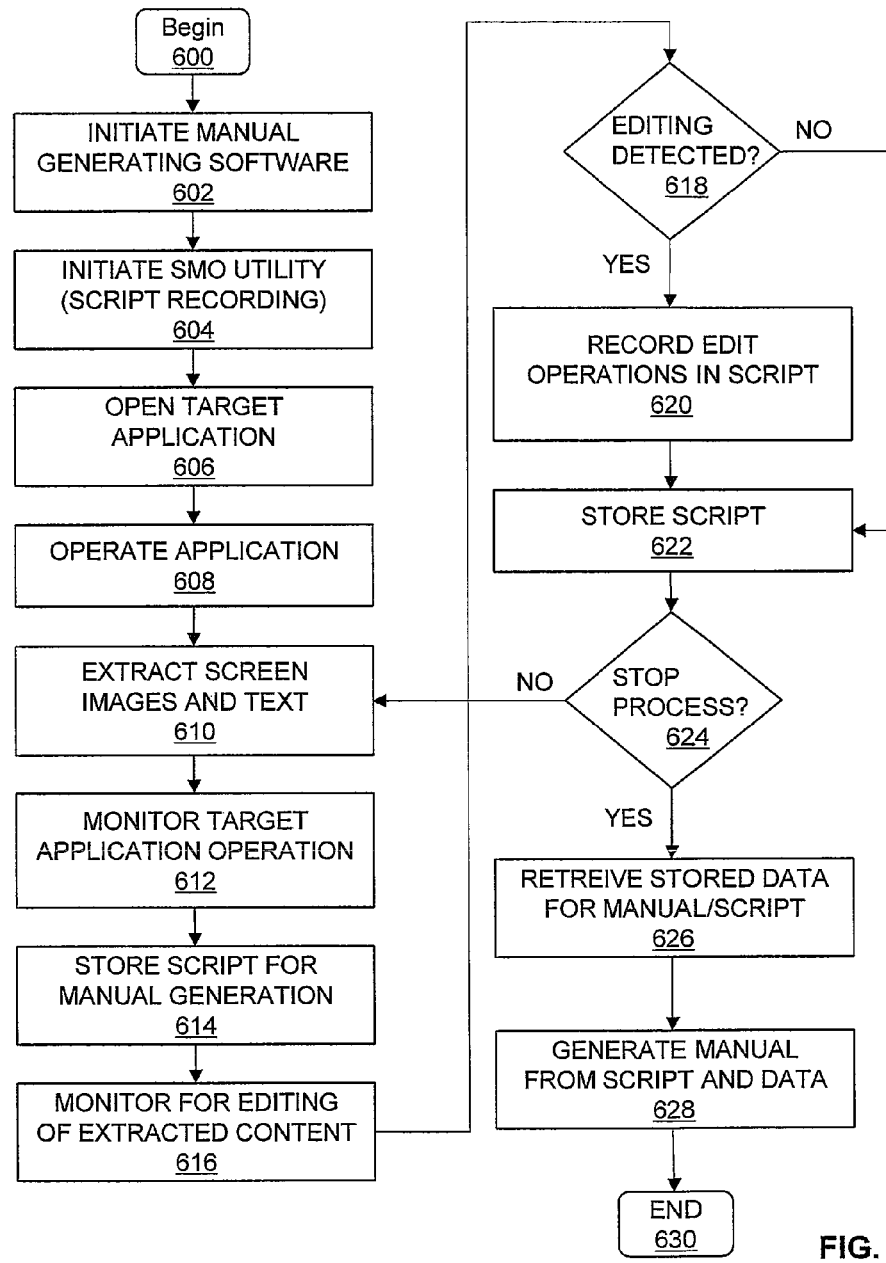
FIG. 6 is a logic flow chart illustrating the process for generating a manual, in accordance with one embodiment of the invention.
Figure 7:
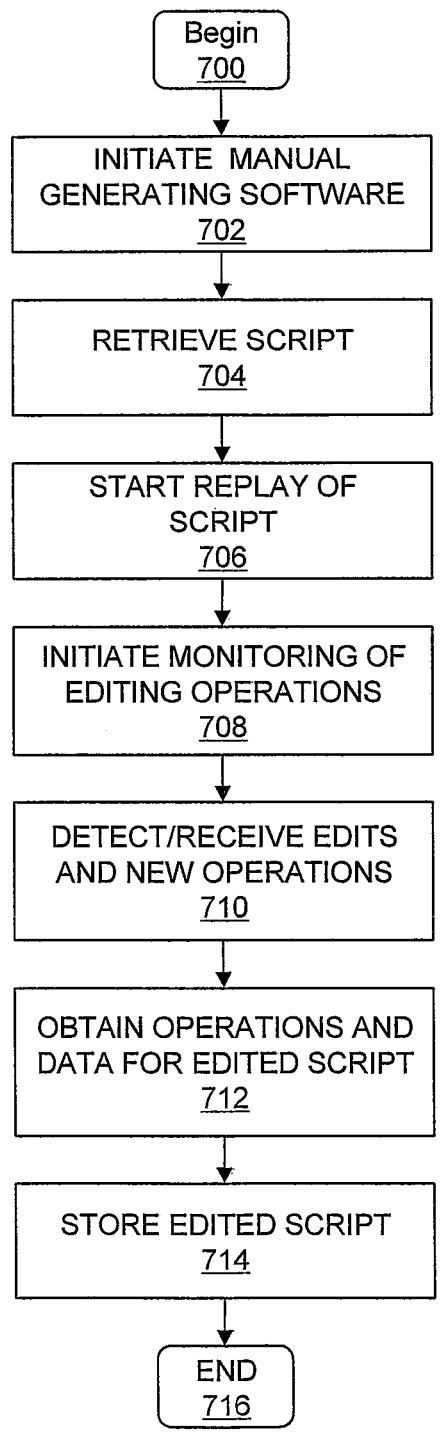
FIG. 7 is a logic flow chart illustrating the process for regeneration and/or modification of a manual, according to one embodiment of the invention.
Figure 8:
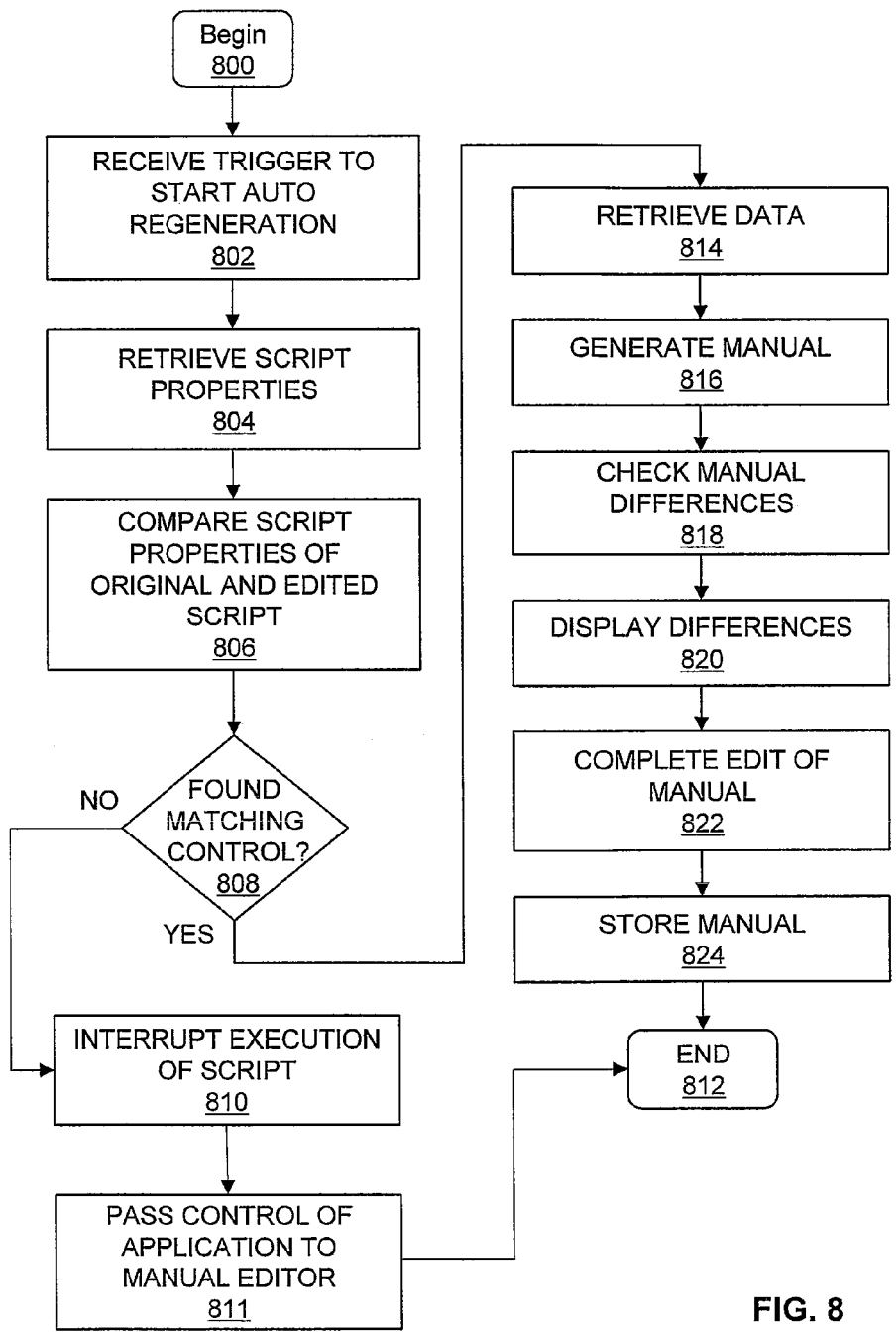
FIG. 8 is a logic flow chart illustrating the auto-operation process for regeneration and/or modification of a manual, in accordance with one embodiment of the invention.

FIGS. 6-8 are flow charts illustrating various methods by which the above processes of the illustrative embodiments are completed. Although the methods illustrated in FIGS. 6-8 may be described with reference to components shown in FIGS. 1-5, it should be understood that this is merely for convenience and alternative components and/or configurations thereof can be employed when implementing the various methods. FIG. 6 describes the method for generation of a manual. The method for regeneration and/or modification of a manual is described by FIG. 7. FIG. 8 describes the method for automatic manual generation and modification. Key portions of the methods may be completed by SMO utility 140 executing within DPS 100 (FIG. 1) and controlling specific operations of manual generation software 145 on DPS 100, and the methods are thus described from the perspective of SMO utility 140 (including operations of manual generation software 145).

The process of FIG. 6 (illustrating manual generation), begins at initiator block 600 and proceeds to block 602, at which a manual author initiates the manual generating software. At block 604, SMO utility 140 is activate (automatically or by manual author) to initiate script recording. The target application, or application comprising content for inclusion within the manual of interest, is opened at block 606 and operation of the application is initiated at block 608, thereby initiating a display of content (including screen images and text). At block 610, the screen images and text are extracted, and relevant data from the extracted screen images and text are recorded. In one embodiment, the extraction and recording of the screen images and text are automatically performed on each screen transition event. At block 612, SMO utility 140 monitors operations being performed during this extraction and recording process, and at block 614, SMO utility 140 saves the operations as script (within a script file). For each event/operation (i.e. addition of control IDs, screen image, text, etc.) data is obtained and stored for the script. Also, within the script, GUI control IDS and coordinates and other layout/operating parameters are recorded.

SMO utility monitors for edits and/or modifications of the extracted content by manual editor, at block 616. For example, the screen image editing may include location of operation marking, trimming, color reduction, and the like. If, as is determined at decision block 618, manual author edits/modifies the extracted content, the editing operations are also recorded as scripts (i.e., within the generated script), as provided at block 620. Then, at block 622, the script, which has been automatically created, is stored for manual generation.

A decision is made at block 624, whether the SMO utility receives a command to end the content retrieval process and proceed to manual generation. If the utility does not receive a command to end the content retrieval process, the process returns to block 608/610. If the utility receives a command to end the content retrieval process at block 624, the process continues to block 626 at which SMO utility 140 retrieves the data associated with the generated script. SMO utility 140 automatically runs the script and the manual is generated from the data within the script, as shown at block 628. The manual is generated by fitting the extracted and edited screen images and text (as edited by the recorded operations) into a pattern established for the manual. The process then ends at block 630

The process of FIG. 7, which illustrates the re-generation and modification of the manual using scripts, begins at block 700. At block 702, manual generating software (SMO utility 140) is initiated. SMO utility 140 (or manual author) retrieves the script (from storage), at block 704. At block 706, replay of the script is initiated (perhaps by selection of play function). SMO utility 140 initiates monitoring for editing operations, at block 708. In one embodiment, activation of monitoring is triggered following a selection by manual author of the pause function. At block 710, The SMO utility detects and receives edits of the script (manual) and/or new operations added to the script. SMO utility monitors operations to the target application to make sure any modification and/or edits are recorded. For each event, data is obtained and stored for the script at block 712. The edited script is stored at block 714, and the process ends at block 716.

The process of FIG. 8, which illustrated auto-regeneration of a manual from scripts, begins at block 800. A trigger to activate the auto regeneration process is received by the SMO utility 140 at block 802. The SMO utility retrieves script properties for the edited script, at block 804. At block 806, the script properties retrieved for the edited script are compared to the script properties for the original script. A decision is made at block 808, whether matching script properties, such as matching control IDs are found between the original and edited manual script. If no matches are found, an interrupt occurs in the execution of the script, at block 810. SMO utility 140 then passes control of the operations within the application to the manual author, as shown at block 811. The process ends at block 812.

If the matches in script properties are found, the script is able to re-generate the manual, and process continues to block 814. At block 814, the data for the edited script is retrieved, and at block 816, the edited manual is generated (re-generated). SMO utility 140 checks the differences between the edited manual and the original manual at block 818. The edited manual (and script) and original manual (and script) are displayed to show the differences between the tow, as provided at block 820. SMO utility 140 then permits the manual editor to complete the edit of the manual, at block 822. At block 824, the edited manual and associated script are stored. And, the process ends at block 812.

In the flow charts above, one or more of the methods are embodied as a computer program product in a computer readable medium or containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture (or computer program product) in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a computer program product in a variety of forms, and that an illustrative embodiment of the present invention applies equally regardless of the particular type of media used to actually carry out the distribution. By way of example, a non exclusive list of types of media, includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. In a data processing system, a method comprising:

extracting information from a target application and monitoring first operations associated with the extracted information during operation of the target application;

recording the extracted information and first operations within a first script;

creating a manual for the target application using the first script;

providing a first affordance that enables playback of the first script;

providing a second affordance that pauses playback of the first script;

detecting a selection of the first affordance, wherein upon detection:

initiating the playback of the first script to provide a visual indication of a content of the manual; and detecting a selection of the second affordance during the playback;

in response to the detecting that the second affordance has been selected during the playback, pausing the first script and beginning to actively monitor the first script for modifications to the extracted information recorded within the first script; and in response to detecting a selection of the first affordance during the pausing, ceasing to actively monitor the first script for the modifications to the extracted information recorded within the first script;

dynamically recording second operations that perform the modifications to the extracted information within a second script, the recording of the second script including recording control identifications, coordinates, text, and image dimensions of the extracted information; and
creating a modified manual using the second script.

2. The method of claim 1, further comprising:
enabling editing of the extracted information to generate the modifications to the extracted information; and
dynamically updating the second script to reflect the second operations that resulted in the modifications to the extracted information.

3. The method of claim 1, wherein the extracted information includes screen images and the text, said method further comprising
storing the screen images and the text for each screen transition event produced by the target application within the first script;
wherein the first script includes script properties, original information, and the first operations of the screen images and text.

4. The method of claim 3, wherein the modifications to the extracted information further includes editing operations on the screen images and text to generate an edited screen image and edited text during the second operations;
wherein said recording of the second script automatically records the editing operations; and
said creating includes:
retrieving the first script of the extracted screen images and the extracted text obtained during the first operations;
receiving the second operations comprising edits to the extracted screen images and the extracted text to provide the edited screen images and edited text; and
recording the second script, wherein the creating generates the modified manual with the edited screen images and edited text included therein.

5. The method of claim 3, wherein when the selection of the second affordance is detected, said method further comprises:
pausing the playback of the first script at a breakpoint;
monitoring for the editing operations performed on the extracted information and for addition of additions to the second operations directly within the first script at the breakpoint; and
enabling resumption of playback of the first script when selection of the first affordance is detected.

6. The method of claim 5, further comprising:
comparing first properties of the first script with second properties of the second script; and
presenting detected differences between the first properties and the second properties in a compare box.

7. The method of claim 1, further comprising:
transcribing text of the manual from a first language into a second language to create a first language manual;
extracting one or more screen images of the first language manual;
recording, in the second script, changes to embedded information within the one or more screen images and changes to visual parameters of components within the one or more screen images;
enabling generation of a second language manual using the first script and the first language manual modified with the second operations detected during the modifications to the extracted information within the first script; and providing a compare box indicating differences between a first language version of the first script and first language manual, and a second language version of the first script and second language manual.

8. A computer program product comprising:
a storage medium; and
a manual generating utility having program code that when executed by a processor performs the functions of:
extracting information from a target application and monitoring first operations associated with the extracted information during operation of the target application;
recording the extracted information and first operations within a first script;
creating a manual for the target application using the first script;
providing a first affordance that enables playback of the first script;
providing a second affordance that pauses playback of the first script;
detecting a selection of the first affordance, wherein upon detection:
initiating the playback of the first script to provide a visual indication of a content of the manual; and
detecting a selection of the second affordance during the playback;
in response to the detecting that the second affordance has been selected during the playback, automatically pausing the playback of the first script at a breakpoint and beginning to actively monitor the first script for the second operations that perform the modifications to the extracted information and for the addition of third operations directly within the first script at the breakpoint;
in response to detecting a selection of the first affordance during the pausing, ceasing to actively monitor the first script for the second operations that perform the modifications to the extracted information and the addition of the third operations directly within the first script, and resuming playback of the first script;
dynamically recording the second operations and third operations within a second script, the recording of the second script including recording control identifications, coordinates, text, and image dimensions of the extracted information; and
creating a modified manual using the second script.

9. The computer program product of claim 8, wherein said program code further comprises code for:
enabling editing of the extracted information to generate the modifications to the extracted information; and
dynamically updating the second script to reflect the second operations that resulted in the modifications to the extracted information.

10. The computer program product of claim 8, wherein the extracted information includes screen images and text, and said program code further comprises code for
storing the screen images and the text for each screen transition event produced by the target application within the first script;
wherein the first script includes script properties, original information, and the first operations of the screen images and text.

11. The computer program product of claim 10, wherein the modifications to the extracted information further includes editing operations on the screen images and text to generate an edited screen image and edited text during the second operations;
   wherein said recording automatically records the editing operations; and
   said creating includes:
      retrieving the first script of the extracted screen images and the extracted text obtained during the first operations;
      receiving the second operations comprising edits to the extracted screen images and the extracted text to provide the edited screen images and edited text; and
      recording the second script, wherein the creating generates the modified manual with the edited screen images and edited text included therein.

12. The computer program product of claim 11, further comprising:
   comparing first properties of the first script with second properties of the second script; and
   presenting detected differences between the first properties and the second properties in a compare box.

13. The computer program product of claim 8, said program code further comprising code for:
   transcribing text of the manual from a first language into a second language to create a first language manual;
   extracting one or more screen images of the first language manual;
   recording, in the second script, changes to embedded information within the one or more screen images and changes to visual parameters of components within the one or more screen images;
   generating a second language manual using the first script and the first language manual modified with the second operations detected during the modifications to the extracted information within the first script; and
   providing a compare box indicating differences between a first language version of the first script and first manual, and a second language version of the first script and second manual.

14. A computer device comprising:
   a processor;
   a memory coupled to the processor;
   a utility executing on the processor and having executable code that provides the functionality of:
      extracting information from a target application and monitoring first operations associated with the extracted information during operation of the target application;
      recording the extracted information and first operations within a first script;
      creating a manual for the target application using the first script;
      in response to pausing a playback of the first script, actively monitoring the first script for modifications to the extracted information recorded within the first script and dynamically recording the modifications to the extracted information within a second script, the recording of the second script including recording control identifications, coordinates, text, and image dimensions of the extracted information;
      in response to resuming the playback of the first script, ceasing to actively monitor the first script for the modifications to the extracted information recorded within the first script;
      recording, in the second script, changes to embedded information within the one or more screen images and changes to visual parameters of components within the one or more screen images;
      dynamically updating the second script to reflect second operations that generate additional modifications to the extracted information performed during the playback of the first script;
      creating a modified manual using the second script;
      transcribing the text of the first manual from a first language into a second language to create a first language manual;
      extracting one or more screen images of the first language manual;
      generating a second language manual using the first script and the first language manual modified with the second operations detected during the modifications to the extracted information within the first script; and
      providing a compare box indicating differences between a first language version of the first script and a second language version of the first script.

15. The computer device of claim 14, wherein the extracted information includes screen images and text, and said program code further comprises code for:
   storing the screen images and the text for each screen transition event produced by the target application within the first script,
   wherein the first script includes script properties, original information, and the first operations of the screen images and the text,
   wherein the modifications to the extracted information further includes editing operations on the screen images and text to generate an edited screen image and edited text during the second operations, and
   wherein said creating includes:
      retrieving the first script of the extracted screen images and the extracted text obtained during the first operations;
      receiving the second operations comprising edits to the extracted screen images and the extracted text to provide the edited screen images and edited text; and
      recording the second script, wherein the creating generates the modified manual with the edited screen images and edited text included therein.

16. The computer device of claim 15, said program code further comprising code for:
   enabling activation of a script generating function and an automatic recording of detected operations function;
   providing a first affordance that enables the playback of the first script;
   providing a second affordance that of the first script;
   detecting a selection of the first affordance; and
   when the first affordance is selected:
      playing the first script to provide a visual indication of the content of the manual;
      activating the second affordance for selection; and
      detecting a selection of the second affordance during the playback;
   when a selection of the second affordance is detected:
      performing the playback pause of the first script at a breakpoint;
      monitoring for the second operations performed on the extracted information and for addition of new operations directly within the first script at the breakpoint; and
      enabling resumption of playback of the first script when selection of the first affordance is detected; and comparing first properties of the first script with second properties of the second script;
presenting detected differences between the first properties and the second properties in a compare box.

* * * * *